US012763887B2

(12) United States Patent
Takeda et al.

(10) Patent No.: US 12,763,887 B2
(45) Date of Patent: Oct. 13, 2026

(54) NETWORK NODE, TERMINAL APPARATUS, CONTROL METHOD, AND COMPUTER-READABLE STORAGE MEDIUM FOR ENHANCING EFFICIENCY IN COMMUNICATION USING CARRIER WAVES

(71) Applicant: KDDI CORPORATION, Tokyo (JP)

(72) Inventors: Hiroki Takeda, Tokyo (JP); Mikiya Agata, Tokyo (JP); Satoshi Itou, Tokyo (JP); Tomohide Shimomura, Tokyo (JP); Yasuki Suzuki, Tokyo (JP); Yuuichi Hasegawa, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 279 days.

(21) Appl. No.: 18/442,511

(22) Filed: Feb. 15, 2024

(65) Prior Publication Data

US 2024/0187150 A1 Jun. 6, 2024

Related U.S. Application Data

(63) Continuation of application No. PCT/JP2023/003749, filed on Feb. 6, 2023.

(30) Foreign Application Priority Data

Feb. 14, 2022 (JP) ................................ 2022-020756

(51) Int. Cl.
*H04L 5/00* (2006.01)
*H04W 76/15* (2018.01)

(52) U.S. Cl.
CPC ............ *H04L 5/001* (2013.01); *H04L 5/0098* (2013.01); *H04W 76/15* (2018.02)

(58) Field of Classification Search
CPC ....... H04L 5/001; H04L 5/0098; H04W 76/15
See application file for complete search history.

(56) References Cited

U.S. PATENT DOCUMENTS

2014/0192663 A1* 7/2014 Rosa .................... H04W 24/02 370/252
2017/0070902 A1 3/2017 Fukuta
(Continued)

FOREIGN PATENT DOCUMENTS

JP 2015-097329 A 5/2015
WO WO-2015/040659 A1 3/2015
(Continued)

OTHER PUBLICATIONS

Japanese Office Action concerning the corresponding Japanese Patent Application No. 2025-035819 dated May 22, 2026 (5 pages).

*Primary Examiner* — Mewale A Ambaye
(74) *Attorney, Agent, or Firm* — Foley & Lardner LLP

(57) ABSTRACT

A network node obtains, from a terminal apparatus, information relating to a first received power of a first carrier wave and a second received power of a second carrier wave for the terminal apparatus, determines whether or not a difference value between the first received power and the second received power is greater than a predetermined value on a basis of the information, and controls the terminal apparatus to start communication using dual connectivity or carrier aggregation using the first carrier wave and the second carrier wave on a basis of a difference value between the first received power and the second received power being determined to be less than the predetermined value.

21 Claims, 3 Drawing Sheets

(56) References Cited

U.S. PATENT DOCUMENTS

| | | | | |
|---|---|---|---|---|
| 2017/0280431 | A1 | 9/2017 | Takahashi et al. | |
| 2019/0254074 | A1 * | 8/2019 | Jeon | H04W 74/0833 |
| 2020/0204237 | A1 * | 6/2020 | Zhou | H04B 7/0408 |
| 2020/0266932 | A1 * | 8/2020 | Yang | H04L 1/1812 |

FOREIGN PATENT DOCUMENTS

| | | | | |
|---|---|---|---|---|
| WO | WO-2015/125716 | A1 | 8/2015 | |
| WO | WO-2016136124 | A1 * | 9/2016 | H04W 72/53 |

* cited by examiner

NETWORK NODE, TERMINAL APPARATUS, CONTROL METHOD, AND COMPUTER-READABLE STORAGE MEDIUM FOR ENHANCING EFFICIENCY IN COMMUNICATION USING CARRIER WAVES

CROSS-REFERENCE TO RELATED APPLICATION(S)

This application is a continuation of International Patent Application No. PCT/JP2023/003749 filed on Feb. 6, 2023, which claims priority to and the benefit of Japanese Patent Application No. 2022-020756 filed on Feb. 14, 2022, the entire disclosures of which are incorporated herein by reference.

BACKGROUND OF THE INVENTION

Field of the Invention

The present invention relates to a wireless communication technique using a plurality of carrier waves.

Description of the Related Art

In the 3rd Generation Partnership Project (3GPP), a mechanism for dual connectivity and carrier aggregation is specified for communication by a terminal apparatus using a plurality of carrier waves (component carrier).

The terminal apparatus may perform processing using a single communication circuit to communicate within the same band with a plurality of carrier waves. In this case, there may be a large difference in values between the received power for each one of the plurality of carrier waves, and, for example, communication using the carrier wave with a low received power may not be able to achieve a sufficient throughput. This may cause the communication efficiency to be insufficient.

SUMMARY OF THE INVENTION

The present invention provides a technique for enhancing the efficiency of communication using a plurality of carrier waves.

According to one aspect of the present invention, there is provided a network node, comprising: one or more processors; and one or more memories that store a computer-readable instruction for causing, when executed by the one or more processors, the one or more processors to function as: an obtaining unit configured to obtain, from a terminal apparatus, information relating to a first received power of a first carrier wave and a second received power of a second carrier wave for the terminal apparatus; a determination unit configured to determine whether or not a difference value between the first received power and the second received power is greater than a predetermined value on a basis of the information; and a control unit configured to control the terminal apparatus to start communication using dual connectivity or carrier aggregation using the first carrier wave and the second carrier wave on a basis of a difference value between the first received power and the second received power being determined to be less than the predetermined value.

According to another aspect of the present invention, there is provided a network node, comprising: one or more processors; and one or more memories that store a computer readable instruction for causing, when executed by the one or more processors, the one or more processors to function as: an obtaining unit configured to obtain, from a terminal apparatus, information relating to a first received power of a first carrier wave and a second received power of a second carrier wave for the terminal apparatus; a determination unit configured to determine whether or not a difference value between the first received power and the second received power is greater than a predetermined value on a basis of the information; and a control unit configured to, in a case where the terminal apparatus is performing communication using dual connectivity or carrier aggregation using the first carrier wave and the second carrier wave and a difference value between the first received power and the second received power is determined to be greater than the predetermined value, control the terminal apparatus to end the communication.

According to another aspect of the present invention, there is provided a terminal apparatus that is connected to a base station, which uses first information, obtained from the terminal apparatus, for specifying a communication circuit of the terminal apparatus to perform control regarding dual connectivity or carrier aggregation, the terminal apparatus comprising: one or more processors; and one or more memories that store a computer-readable instruction for causing, when executed by the one or more processors, the one or more processors to function as: a reporting unit configured to report, to the base station apparatus, the first information and second information relating to a first received power of a first carrier wave and a second received power of a second carrier wave, wherein the first carrier wave and the second carrier wave are used for the dual connectivity or the carrier aggregation.

Further features of the present invention will become apparent from the following description of exemplary embodiments with reference to the attached drawings.

DESCRIPTION OF THE EMBODIMENTS

Figure 1:
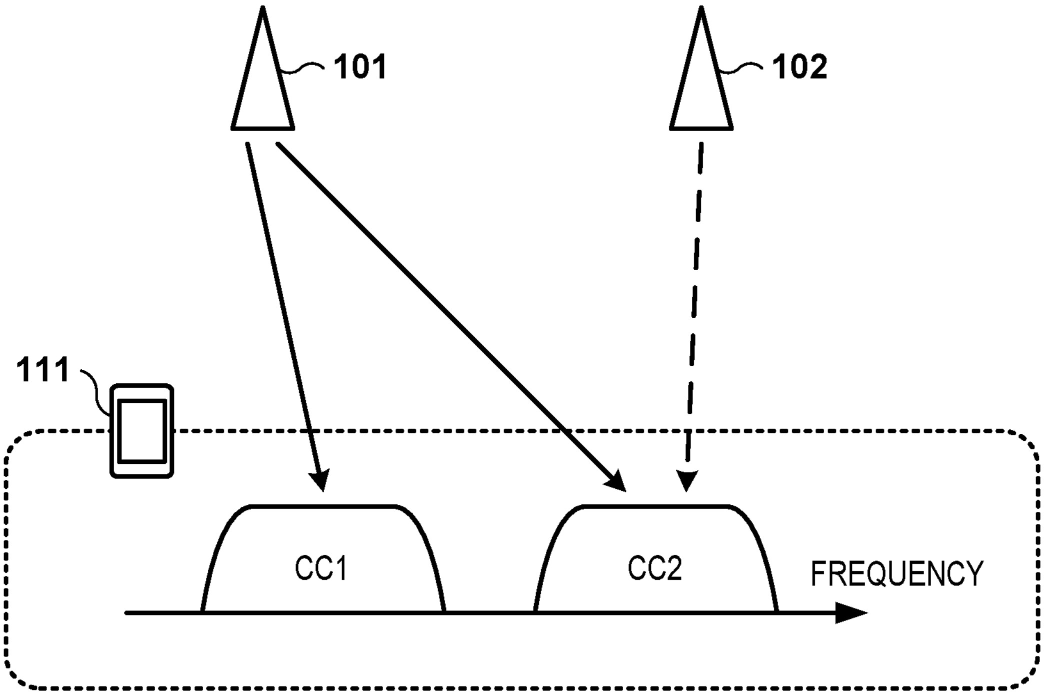
FIG. 1 is a diagram schematically illustrating an example of the configuration of a wireless communication system.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

Network Configuration

FIG. 1 is a diagram illustrating an example of a network configuration according to the present embodiment. The present network is a cellular wireless communication network for wireless communication compliant with Long- Term Evolution (LTE) and New Radio (NR) of 3rd Generation Partnership Project (3GPP), for example. The present network includes a base station apparatus 101 and a terminal apparatus 111, for example. Note that in the present embodiment, the terminal apparatus 111 is configured to perform communication using dual connectivity (DC) or carrier aggregation (CA) specified as a mechanism for using a plurality of carrier waves (component carriers) in parallel. Note that in the example illustrated in FIG. 1, the terminal apparatus 111 performs communication using two carrier waves, a first carrier wave (CC1) and a second carrier wave (CC2). Note that the communication using the first carrier wave and the second carrier wave may be provided together with the base station apparatus 101 or the base station apparatus 101 may provide communication using the first carrier wave and another base station apparatus 102 may provide communication using the second carrier wave. Also, the terminal apparatus 111 may be configured to communicate using three or more carrier waves in parallel. Note that, for example, the base station apparatus 101 may be a base station apparatus that operates based on NR standards, and the base station apparatus 102 may be a base station apparatus that operates based on LTE standards. The terminal apparatus 111 can communicate using the first carrier wave associated with LTE and the second carrier wave associated with NR in parallel. Also, the terminal apparatus 111 can communicate using the first carrier wave and the second carrier wave both associated with NR in parallel.

The terminal apparatus 111 may perform processing to receive two or more carrier waves using one communication circuit, for example. In this case, for example, if the difference value between a first received power relating to the first carrier wave and a second received power relating to the second carrier wave is greater than a certain value, the throughput of the communication using the carrier wave with the lower received power may be insufficient. For example, according to TS 38.101 of 3GPP, the performance of the terminal apparatus is required to be such that the throughput of the second received power can achieve 85% of the maximum throughput when the first received power is 6 dB higher than the second received power. Thus, in a case where the second received power is even lower, it can be expected that the throughput is further reduced. Accordingly, when throughput is reduced by the difference value between the first received power and the second received power being great, the efficiency of communication using the plurality of carrier waves is decreased.

In the present embodiment, in consideration of the aforementioned situation, a technique is provided for enhancing the efficiency of wireless communication (for example, DC or CA) using a plurality of carrier waves.

The base station apparatus 101 according to the present embodiment, for example, obtains information of the terminal apparatus 111 relating to the first received power relating to the first carrier wave and the second received power relating to the second carrier wave and decides whether or not to cause the terminal apparatus 111 to perform DC or CA on the basis of this information.

In a state where the terminal apparatus 111 is not communicating using DC or CA, the base station apparatus 101 may determine whether or not the difference value between the first received power and the second received power is greater than a predetermined value and may perform control to cause the terminal apparatus 111 to start communication using DC or CA on the basis of the determination that the difference value is not greater than the predetermined value. In the terminal apparatus 111, in a case where the received power difference between the first received power of the first carrier wave in use currently for communication and the second received power of the second carrier wave that can be used for communication using DC or CA is sufficiently small, the terminal apparatus 111 can perform communication using DC or CA without a large reduction to throughput. In other words, a situation in which the received power difference is sufficiently small can be considered to be a situation in which sufficiently efficient communication can be performed by the terminal apparatus 111 when communicating using the second carrier wave as the secondary cell. Thus, the base station apparatus 101 can decide to cause the terminal apparatus 111 to start communicating using DC or CA on the condition that the difference value between the first received power and the second received power is not greater than the predetermined value. Note that in a case where the terminal apparatus 111 should not perform communication using DC or CA, even when the difference value between the first received power and the second received power is not greater than the predetermined value, the base station apparatus 101 may not cause the terminal apparatus 111 to start communicating using DC or CA. In other words, a condition for the terminal apparatus 111 to start communicating using DC or CA is that the difference value between the first received power and the second received power is not greater than the predetermined value. However, even if this condition is satisfied, communication using DC or CA does not need to be started.

Note that in a case where there are a plurality of carrier waves that can be used to perform sufficiently efficient communication when used as the secondary cell with the terminal apparatus 111, the base station apparatus 101 may decide which carrier wave to use for DC or CA depending on the status of the load of the base station apparatus to provide the communication using the carrier wave. The base station apparatus 101, for example, obtains, from the terminal apparatus 111, information that can specify a second difference value between the first received power and a third received power of a third carrier wave in addition to information that can specify a first difference value between the first received power of the first carrier wave and the second received power of the second carrier wave in the terminal apparatus 111. Also, in a case where the base station apparatus 101 determines that the first difference value and the second difference value are both not greater than the predetermined value, the base station apparatus 101 decide whether to use the second carrier wave or the third carrier wave on the basis of the load of the base station apparatus to provide communication using the second carrier wave and the load of the base station apparatus to provide communication using the third carrier wave. For example, in a case where the load of the base station apparatus to provide communication using the second carrier wave is less than the load of the base station apparatus to provide communication using the third carrier wave, the base station apparatus 101 may use the second carrier wave as the secondary cell. Also, in a case where the load of the base station apparatus to provide communication using the third carrier wave is less than the load of the base station apparatus to provide communication using the second carrier wave, the base station apparatus 101 may use the third carrier wave as the secondary cell. Note that in a case where both the load of the base station apparatus to provide communication using the second carrier wave and the load of the base station apparatus to provide communication using the third carrier wave are both sufficiently low, for example, the smaller of the first difference value and the second difference value may be used. In other words, in a case where the first difference value is less than the second difference value, the second carrier wave may be used as the secondary cell, and in a case where the second difference value is less than the first difference value, the third carrier wave may be used as the secondary cell. Note that in a case where the terminal apparatus 111 can use three or more carrier waves in parallel, the base station apparatus 101 may perform control for causing the terminal apparatus 111 to perform communication using DC or CA using both the second carrier wave and the third carrier wave.

Also, in a case where the difference value between the first received power and the second received power is determined to be greater than the predetermined value while communication is being performed by the terminal apparatus 111 using DC or CA using the first carrier wave and the second carrier wave, the base station apparatus 101 may perform control to cause the terminal apparatus 111 to end this communication. In the terminal apparatus 111, in a case where the received power difference between the first received power and the second received power increases while communication is being performed using DC or CA using the first carrier wave and the second carrier wave, it can be predicted that the communication efficiency will decrease. Thus, the base station apparatus 101 is configured to perform control to end communication using DC or CA (for example, communication using the secondary cell).

Note that the base station apparatus 101 may perform only the processing to start the communication using DC or CA as described above or may not perform processing to end such communication using DC or CA. Also, the base station apparatus 101 may perform only processing to end the communication using DC or CA and may not perform processing to start the communication using DC or CA as described above. Also, the base station apparatus 101 may be configured to perform both such processing. In the processing described above, for example, the base station apparatus 101 may allow the start of communication using DC or CA on the basis of a state in which the received power difference value is not greater than the predetermined value continuing for a predetermined amount of time. In a similar manner, in the processing described above, in a case where a state in which the received power difference value is greater than the predetermined value continues for a predetermined amount of time, the base station apparatus 101 may perform control to end the communication using DC or CA in progress. Note that, in a known standard, an event is specified in which, in response to the wireless quality of an adjacent cell with a different radio access technology (RAT) becoming equal to or greater than a predetermined value, a wireless quality measurement report of the currently connected cell and the adjacent cell is performed. The base station apparatus 101 may specify the received power difference value between the first carrier wave and the second carrier wave on the basis of the measurement report at this time and perform the processing described above on the basis of this difference value.

Note that in the terminal apparatus 111, the difference value between the first received power of the first carrier wave and the second received power of the second carrier wave may be calculated. In this case, the base station apparatus 101 notifies the terminal apparatus 111 of the predetermined value described above, for example. Note that the base station apparatus 101 may associate together at least one of the various types of information described above and the condition to be reported and notify the terminal apparatus 111 of the predetermined value. In a case where the notified condition is satisfied, the terminal apparatus 111 may perform a report for at least one of the various types of information described above. For example, the base station apparatus 101 may report as a condition that the difference value between the first received power and the second received power is greater than the predetermined value. Note that a notification of this condition may be performed in a case where the terminal apparatus 111 is already performing communication using DC or CA. For example, in a case where the first carrier wave is a master cell carrier wave, the second carrier wave is a secondary cell carrier wave, and the difference value of the first received power minus the second received power is greater than the predetermined value, the terminal apparatus 111 may transmit a predetermined report to the base station apparatus 101. Also, the base station apparatus 101 may report as a condition that the difference value between the first received power and the second received power is not greater than the predetermined value. Note that a notification of this condition may be performed in a case where the terminal apparatus 111 is not performing communication using DC or CA. In a case where the difference value of the first received power of the first carrier wave associated with the currently connected cell minus the received power of the second carrier wave corresponding to a candidate for a secondary cell in the surroundings is not greater than the predetermined value, the terminal apparatus 111 may transmit the predetermined report to the base station apparatus 101. Also, the base station apparatus 101 may notify the terminal apparatus 111 of a timer value to be set, for example. In this case, the terminal apparatus 111 may activate a timer when the calculated difference value increases above (or decreases below) the predetermined value and, upon this state being maintained until the timer finishes, may transmit a report to the base station apparatus 101. The report here may include a notification of information indicating the difference value, for example. Also, the report here may include a notification of any information that can identify whether or not the difference value is greater than the predetermined value such as information indicating that the difference value is greater than or is less than the predetermined value, for example. Note that the terminal apparatus 111 may notify the base station apparatus 101 of information indicating the first received power and information indicating the second received power.

Note that the terminal apparatus 111 may include a plurality of communication circuits. In this case, the terminal apparatus 111 may be configured to perform processing of the first carrier wave with a first communication circuit and processing of the second carrier wave with a second communication circuit. In a case where a plurality of communication circuits can be used in this manner, communication can be performed without a large reduction in throughput even when the difference value between the first received power of the first carrier wave and the second received power of the second carrier wave is large to a certain degree. In other words, in a case where one communication circuit processes a plurality of carrier waves, if the power difference is large, a carrier wave with lower power may be lost due to an insufficient dynamic range of the communication circuit. However, in a case where separate communication circuits are used, since the effects of other carrier waves that are not the carrier wave being processed at the communication circuit can be suppressed, quality deterioration due to dynamic range is unlikely to occur. However, for example, regarding a carrier wave with low power, since the effects of power leakage from other carrier waves are not always negligible, in a situation where the power difference is very large, there may be cases where the throughput is reduced. Accordingly, even when the processing of a plurality of carrier waves is performed by separate communication circuits, communication may be performed using DC or CA under the condition that the power difference is not greater than the predetermined value. However, a first predetermined value for processing of a plurality of carrier waves by one communication circuit and a second predetermined value for processing of a plurality of carrier waves by separate communication circuits may be set separately. Here, the first predetermined value may be set to be less than the second predetermined value. In other words, in a case where processing of a plurality of carrier waves is performed by one communication circuit, communication using DC or CA may be allowed on the condition that the power difference between the first carrier wave and the second carrier wave is sufficiently small, and in a case where processing of a plurality of carrier waves is performed by separate communication circuits, communication using DC or CA may be allowed even when the power difference is greater than the first predetermined value.

Note that the base station apparatus 101 may obtain information from the terminal apparatus 111 indicating whether the terminal apparatus 111 is to perform processing of a plurality of carrier waves using one communication circuit or whether the terminal apparatus 111 is to perform processing of a plurality of carrier waves using separate communication circuits, for example. Note that this information may be information indicating the number of communication circuits included in the terminal apparatus 111, for example.

Note that in the example described above, the base station apparatus 101 controls the communication using dual connectivity or carrier aggregation with the terminal apparatus 111 on the basis of the size of the difference value of the received power at the terminal apparatus 111. However, no such limitation is intended. That is, the processing described above may be performed by any network node included in the base station apparatus 101.

Apparatus Configuration

Figure 2:
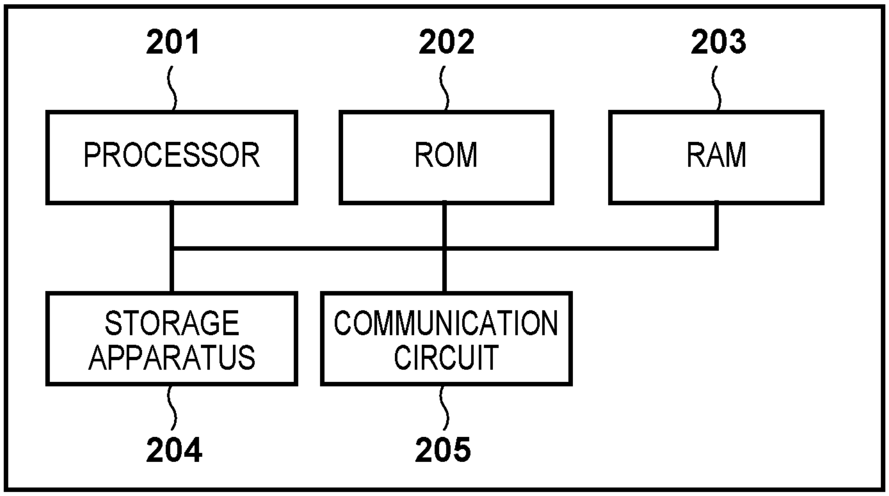
FIG. 2 is a diagram illustrating an example of the hardware configuration of a base station apparatus.

FIG. 2 is a diagram illustrating an example of the hardware configuration of the base station apparatus 101. The base station apparatus 101 includes, for example, a processor 201, ROM 202, RAM 203, a storage apparatus 204, and a communication circuit 205. The processor 201 is a computer, such as a general-purpose central processing unit (CPU), an application specific integrated circuit (ASIC), or the like, including one or more processing circuits. By the processor 201 reading out and executing a program stored in the ROM 202 and the storage apparatus 204, the processing of the entire apparatus and the processing described above are executed. The ROM 202 is read-only memory that stores information, such as a program relating to processing executed by the base station apparatus 101, various parameters, and the like. The RAM 203 is random-access memory that functions as a work space when the processor 201 executes a program and temporary stores information. The storage apparatus 204 is constituted by a detachable external storage device, for example. The communication circuit 205 is constituted by a circuit for LTE or 5G wireless communication, for example. Note that in FIG. 2, only the single communication circuit 205 is illustrated, but the base station apparatus 101 may include a plurality of communication circuits. For example, the base station apparatus 101 may include a communication circuit for wired communication with another base station apparatus (for example, the base station apparatus 102).

Figure 3:
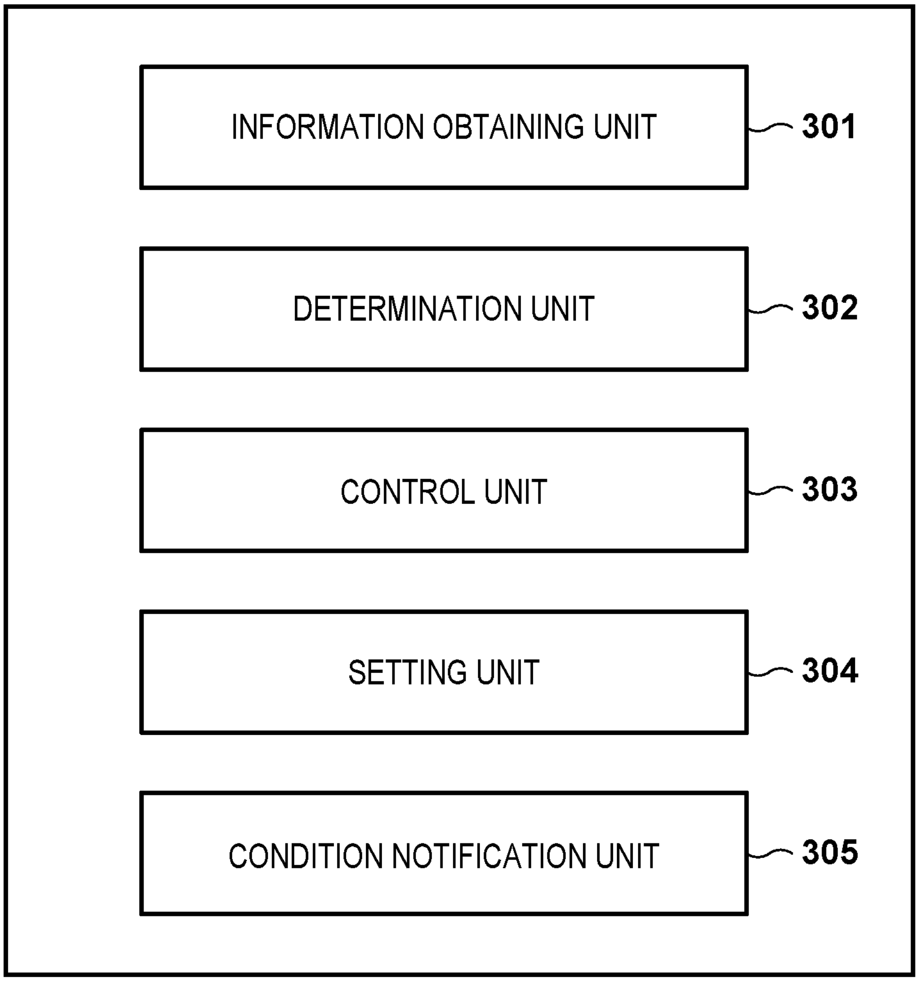
FIG. 3 is a diagram illustrating an example of the functional configuration of the base station apparatus.
Figure 4:
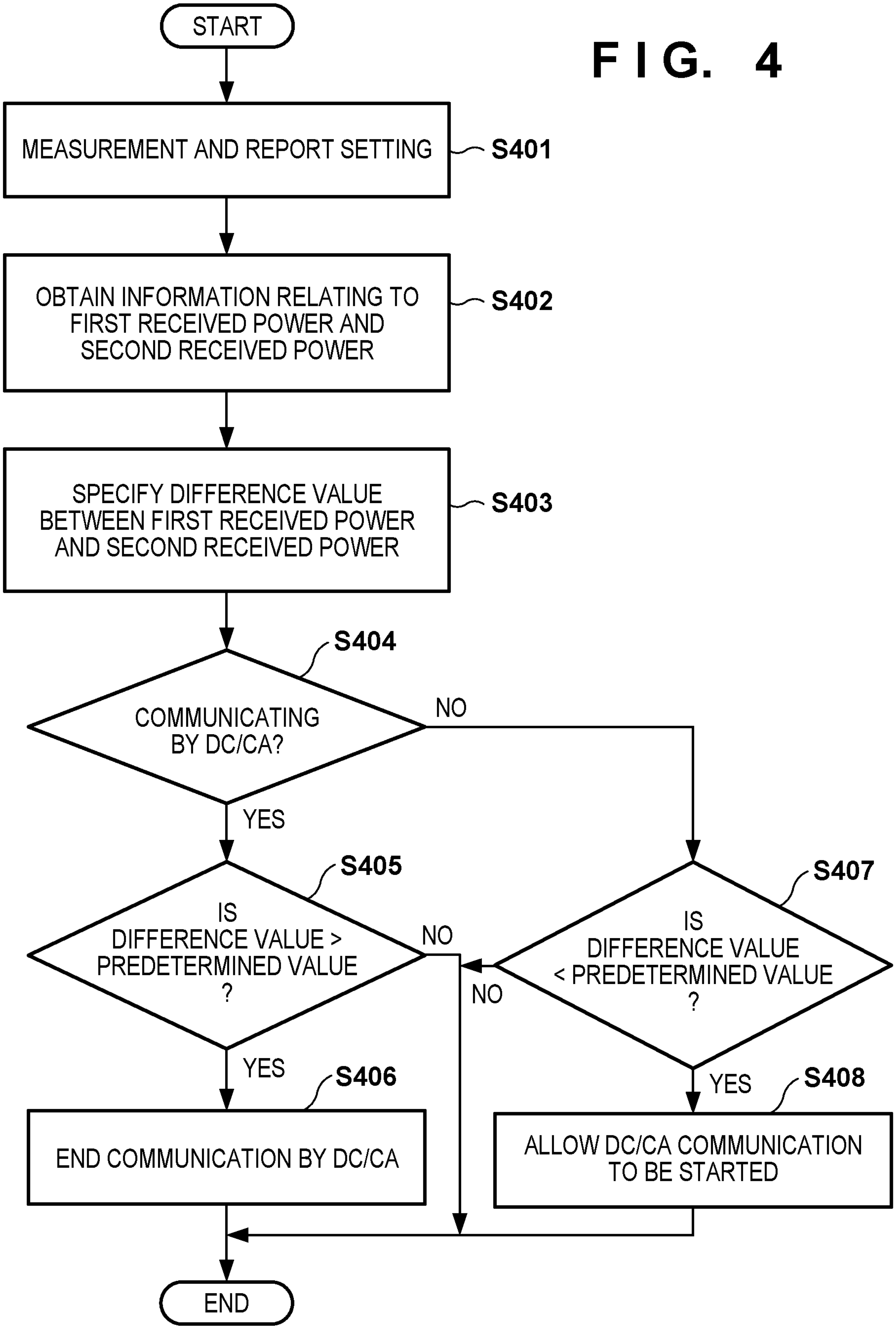
FIG. 4 is a diagram illustrating an example of the flow of the processing performed by the base station apparatus.

FIG. 3 is a diagram illustrating an example of the functional configuration of the base station apparatus 101. The base station apparatus 101, for example, includes an information obtaining unit 301, a determination unit 302, a control unit 303, a setting unit 304, and a condition notification unit 305. These functional units may be implemented, for example, by the processor 201 executing a program stored in the ROM 202 or the storage apparatus 204. However, no such limitation is intended, and one or more or all of these functional units may be implemented using dedicated hardware, for example. Note that the processing executed by the base station apparatus 101 has been described above, and thus only a brief description of the functional configuration of the base station apparatus 101 will be given here.

The information obtaining unit 301 obtains information relating to the first received power obtained by the terminal apparatus 111 measuring the first carrier wave corresponding to the currently connected cell and the second received power obtained by measuring the second carrier wave corresponding to the secondary cell currently in use in communication using DC or CA or a usable secondary cell candidate. Note that this information may include information indicating the first received power and information indicating the second received power. Also, this information may include information indicating the difference value between the first received power and the second received power. Also, this information may include information that can identify whether or not the difference value between the first received power and the second received power is greater than the predetermined value. Note that the information obtaining unit 301 may obtain information relating to the received power of two or more other carrier waves (for example, the second carrier wave and the third carrier wave) in addition to that of the first carrier wave corresponding to the currently connected cell. Also, for example, the information obtaining unit 301 may obtain, from the terminal apparatus 111, information indicating whether the terminal apparatus 111 performs processing of a plurality of carrier waves using one communication circuit or perform processing using separate communication circuits.

The determination unit 302 determines whether or not the difference value between the first received power and the second received power is greater than the predetermined value on the basis of the information obtained by the information obtaining unit 301. Also, in a case where information relating to the third received power is obtained by the information obtaining unit 301, for example, the determination unit 302 may determine whether or not the difference value between the first received power and the third received power is greater than the predetermined value.

The control unit 303 performs control relating to communication using DC or CA of the terminal apparatus 111 on the basis of the result of the determination by the determination unit 302. In a case where, for example, the terminal apparatus 111 is not performing communication using DC or CA using the second carrier wave, the control unit 303 controls the terminal apparatus 111 to start communication using DC or CA using the second carrier wave on the basis of the difference value between the first received power and the second received power being not greater than the predetermined value. Also, in a case where, for example, the terminal apparatus 111 is currently performing communication using DC or CA using the second carrier wave and the difference value between the first received power and the second received power is greater than the predetermined value, the control unit 303 controls the terminal apparatus 111 to end communication using DC or CA. Also, for example, in a case where the terminal apparatus 111 is not performing communication using DC or CA using at least one of the second carrier wave and the third carrier wave, the difference value between the first received power and the second received power is not greater than the predetermined value, and the difference value between the first received power and the third received power is not greater than the predetermined value, the control unit 303 may decide which carrier wave to use in communication using DC or CA on the basis of the load of the base station apparatus providing communication using the second carrier wave and the load of the base station apparatus providing communication using the third carrier wave. Note that the control unit 303 may control the terminal apparatus 111 by transmitting a radio resource control (RRC) message to the terminal apparatus 111, for example.

The setting unit 304 sets the predetermined value described above for the terminal apparatus 111, for example. The setting unit 304 may set the first predetermined value in a case where the terminal apparatus 111 performs processing of a plurality of carrier waves using one communication circuit and may set the second predetermined value greater than the first predetermined value in a case where the terminal apparatus 111 performs processing of a plurality of carrier waves using separate communication circuits, for example. Note that the setting unit 304 may set the predetermined value on the basis of capability information of the terminal apparatus 111 different from the number of communication circuits, for example. In other words, even in a case where the received power difference of the plurality of carrier waves is great, the terminal apparatus 111 may set the predetermined value to a large value if the terminal apparatus 111 have the capability of being able to separate signals with high accuracy. In this manner, the setting unit 304 may set a different predetermined value for each terminal apparatus on the basis of the capability information of the terminal apparatus. The condition notification unit 305 notifies the terminal apparatus 111 of information indicating a condition to be satisfied when the terminal apparatus 111 reports information relating to a first reception quality and a second reception quality (and in some cases, a third reception quality) to the base station apparatus 101. Note that the condition may include the difference value between the first received power and the second received power being greater than the predetermined value. Also, the condition may include the difference value between the first received power and the second received power not being greater than the predetermined value. Note that the predetermined value here may be the same value or a different value from the predetermined value used in the determination unit 302.

Processing Flow

Next, an example of the flow of the processing performed by the base station apparatus 101 will be described. The base station apparatus 101 first performs measurement and report settings for the terminal apparatus 111 (step S401). For example, the base station apparatus 101 notifies the terminal apparatus 111 of measurement settings information of the carrier wave to be measured (for example, the first carrier wave corresponding to the serving cell of the terminal apparatus 111 provided by the base station apparatus 101 and the second carrier wave corresponding to the secondary cell or a candidate for the secondary cell). Also, for example, the base station apparatus 101 instructs the terminal apparatus 111 to report information relating to the first received power of the first carrier wave and the second received power of the second carrier wave. Also, for example, the base station apparatus 101 may notify the terminal apparatus 111 of information indicating a condition for reporting.

Thereafter, the base station apparatus 101 obtains information relating to the first received power and the second received power from the terminal apparatus 111 (step S402). Then, the base station apparatus 101 identifies the difference value between the first received power and the second received power (step S403). For example, the base station apparatus 101 may obtain the information indicating the first received power and the information indicating the second received power in step S402 and may calculate the difference value from the values indicated by the information in step S403. Also, the base station apparatus 101 may receive a message including information indicating the difference value between the first received power and the second received power in step S402 and may identify the difference value by analyzing the message in step S403. Also, the base station apparatus 101 may obtain information that can identify whether or not the difference value between the first received power and the second received power is greater than the predetermined value in step S402. In this case, identifying the difference value in step S403 may not be performed.

In a case where the terminal apparatus 111 is currently communicating using DC or CA (YES in step S404), the base station apparatus 101 determines whether or not the difference value obtained in step S403 is greater than the predetermined value (step S405). Then, in a case where the difference value is greater than the predetermined value (YES in step S405), the base station apparatus 101 decides to end the communication using DC or CA currently being performed and controls the terminal apparatus 111 in accordance with this decision (step S406). On the other hand, in a case where the difference value is not greater than the predetermined value (NO in step S405), the base station apparatus 101 ends the processing without ending the communication using DC or CA currently being performed. Note that in this case as well, naturally the communication using DC or CA may be ended if the communication using DC or CA with the terminal apparatus 111 become unnecessary, for example.

Also, in a case where the terminal apparatus 111 is not currently communicating using DC or CA (NO in step S404), the base station apparatus 101 determines whether or not the difference value obtained in step S403 is greater than the predetermined value (step S407). Then, in a case where the difference value is not greater than the predetermined value (YES in step S407), the base station apparatus 101 allows the terminal apparatus 111 to perform communication using DC or CA (step S408). Note that the predetermined value of step S407 may be the same or different from the predetermined value of step S405. Then, in a case where communication using DC or CA is to be performed in the terminal apparatus 111, the base station apparatus 101 performs settings for communication using DC or CA. For example, the base station apparatus 101 controls the terminal apparatus 111 by transmitting an RRC message to the terminal apparatus 111. On the other hand, in a case where the difference value is not greater than the predetermined value (YES in step S407), the base station apparatus 101 ends the processing as is without allowing the terminal apparatus 111 to perform communication using DC or CA.

In this manner, in the present embodiment, communication is performed using DC or CA using a combination of carrier waves which create a large difference value between the received powers of the plurality of carrier waves measured at the terminal apparatus. As a result, communication efficiency can be enhanced, which contributes to Goal 9 of the sustainable development goals (SDGs) initiated by the United Nations of "building resilient infrastructure, promoting sustainable industrialization, and foster innovation".

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A network node, comprising:

one or more processors; and one or more memories that store a computer-readable instruction for causing, when executed by the one or more processors, the one or more processors to function as:

an obtaining unit configured to obtain, from a terminal apparatus, information relating to a first received power of a first carrier wave and a second received power of a second carrier wave for the terminal apparatus;

a setting unit configured to set a first value as a predetermined value in a case where the terminal apparatus performs processing of the first carrier wave and the second carrier wave with one communication circuit and to set a second value as the predetermined value in a case where the terminal apparatus performs processing of the first carrier wave and the second carrier wave with separate communication circuits;

a determination unit configured to determine whether or not a difference value between the first received power and the second received power is greater than the predetermined value on a basis of the information; and a control unit configured to control the terminal apparatus to start communication using dual connectivity or carrier aggregation using the first carrier wave and the second carrier wave on a basis of a difference value between the first received power and the second received power being determined to be less than the predetermined value, wherein the obtaining unit further obtains, from the terminal apparatus, information indicating whether the terminal apparatus is to perform processing of the first carrier wave and the second carrier wave with one communication circuit or whether the terminal apparatus is to perform processing with separate communication circuits.

2. The network node according to claim 1, wherein the obtaining unit further obtains, from the terminal apparatus, information relating to a third received power of a third carrier wave for the terminal apparatus, and on a basis of a difference value between the first received power and the second received power being determined to be not greater than the predetermined value and a difference value between the first received power and the third received power being determined to be not greater than the predetermined value, the control unit performs control to in a case where a load of a base station apparatus providing communication using the second carrier wave is less than a load of a base station apparatus providing communication using the third carrier wave, cause the terminal apparatus to start communication using dual connectivity or carrier aggregation using the first carrier wave and the second carrier wave, and in a case where a load of a base station apparatus providing communication using the third carrier wave is less than a load of a base station apparatus providing communication using the second carrier wave, cause the terminal apparatus to start communication using dual connectivity or carrier aggregation using the first carrier wave and the third carrier wave.

3. A network node, comprising:

one or more processors; and one or more memories that store a computer readable instruction for causing, when executed by the one or more processors, the one or more processors to function as:

an obtaining unit configured to obtain, from a terminal apparatus, information relating to a first received power of a first carrier wave and a second received power of a second carrier wave for the terminal apparatus;

a setting unit configured to set a first value as a predetermined value in a case where the terminal apparatus performs processing of the first carrier wave and the second carrier wave with one communication circuit and to set a second value as the predetermined value in a case where the terminal apparatus performs processing of the first carrier wave and the second carrier wave with separate communication circuits;

a determination unit configured to determine whether or not a difference value between the first received power and the second received power is greater than the predetermined value on a basis of the information; and a control unit configured to, in a case where the terminal apparatus is performing communication using dual connectivity or carrier aggregation using the first carrier wave and the second carrier wave and a difference value between the first received power and the second received power is determined to be greater than the predetermined value, control the terminal apparatus to end the communication, wherein the obtaining unit further obtains, from the terminal apparatus, information indicating whether the terminal apparatus is to perform processing of the first carrier wave and the second carrier wave with one communication circuit or whether the terminal apparatus is to perform processing with separate communication circuits.

4. The network node according to claim 1, wherein the obtaining unit obtains, from the terminal apparatus, information indicating the first received power and information indicating the second received power as information relating to the first received power and the second received power for the terminal apparatus.

5. The network node according to claim 1, wherein the obtaining unit obtains, from the terminal apparatus, information indicating a difference value between the first received power and the second received power as information relating to the first received power and the second received power for the terminal apparatus.

6. The network node according to claim 1, wherein the obtaining unit obtains, from the terminal apparatus, information that can identify whether or not a difference value between the first received power and the second received power is greater than the predetermined value as information relating to the first received power and the second received power for the terminal apparatus.

7. The network node according to claim 1, wherein the computer-readable instruction causes, when executed by the one or more processors, the one or more processors to further function as:

a notifying unit configured to notify the terminal apparatus of information indicating a condition for notifying of information relating to the first received power and the second received power for the terminal apparatus.

8. The network node according to claim 7, wherein the notifying unit, as the condition, indicates that a difference value between the first received power and the second received power for the terminal apparatus is greater than the predetermined value.

9. The network node according to claim 7, wherein the notifying unit, as the condition, indicates that a difference value between the first received power and the second received power for the terminal apparatus is not greater than the predetermined value.

10. The network node according to claim 1, wherein the first carrier wave is a carrier wave associated with long-term evolution (LTE) and the second carrier wave is a carrier wave associated with new radio (NR).

11. The network node according to claim 1, wherein the first carrier wave and the second carrier wave are carrier waves associated with new radio (NR).

12. A terminal apparatus that is connected to a base station apparatus, which uses first information, obtained from the terminal apparatus, for specifying a communication circuit of the terminal apparatus to perform control regarding dual connectivity or carrier aggregation, the terminal apparatus comprising:

one or more processors; and one or more memories that store a computer-readable instruction for causing, when executed by the one or more processors, the one or more processors to function as:

a reporting unit configured to report, to the base station apparatus, the first information and second information relating to a first received power of a first carrier wave and a second received power of a second carrier wave, wherein the first carrier wave and the second carrier wave are used for the dual connectivity or the carrier aggregation, wherein the first information is information used for determining whether processing for a plurality of carrier waves is performed by using a single communication circuit or a plurality of separate communication circuits.

13. The terminal apparatus according to claim 12, wherein the first information is information used for determine, even in a case where difference in power of two carrier waves is larger than a predetermined level, whether processing of a plurality of carrier waves using respective communication circuits for each carrier wave is possible or not.

14. The terminal apparatus according to claim 12, wherein the first information is information used for determine, in a case where difference in power of two carrier waves is larger than a predetermined level, whether the terminal apparatus comprises a communication circuit for preventing throughput from being reduced or not.

15. The terminal apparatus according to claim 12, wherein the terminal apparatus is connected to a base station apparatus that performs, based on the first information and difference in received power of the first received power and the second received power obtained from the terminal apparatus, determination of start or end of communication using the dual connectivity or the carrier aggregation and that instructs, based on a result of the determination, the start or the end of the communication using the dual connectivity or the carrier aggregation to the terminal apparatus.

16. A control method executed by a network node, comprising:

obtaining, from a terminal apparatus, information relating to a first received power of a first carrier wave and a second received power of a second carrier wave for the terminal apparatus;

setting a first value as a predetermined value in a case where the terminal apparatus performs processing of the first carrier wave and the second carrier wave with one communication circuit and setting a second value as the predetermined value in a case where the terminal apparatus performs processing of the first carrier wave and the second carrier wave with separate communication circuits;

determining whether or not a difference value between the first received power and the second received power is greater than the predetermined value on a basis of the information; and controlling the terminal apparatus to start communication using dual connectivity or carrier aggregation using the first carrier wave and the second carrier wave on a basis of the difference value between the first received power and the second received power being determined to be less than the predetermined value, wherein in the obtaining, information indicating whether the terminal apparatus is to perform processing of the first carrier wave and the second carrier wave with one communication circuit or whether the terminal apparatus is to perform processing with separate communication circuits is obtained from the terminal apparatus.

17. A control method executed by a network node, comprising:

obtaining, from a terminal apparatus, information relating to a first received power of a first carrier wave and a second received power of a second carrier wave for the terminal apparatus;

setting a first value as a predetermined value in a case where the terminal apparatus performs processing of the first carrier wave and the second carrier wave with one communication circuit and setting a second value as the predetermined value in a case where the terminal apparatus performs processing of the first carrier wave and the second carrier wave with separate communication circuits;

determining whether or not a difference value between the first received power and the second received power is greater than the predetermined value on a basis of the information; and in a case where the terminal apparatus is performing communication using dual connectivity or carrier aggregation using the first carrier wave and the second carrier wave and a difference value between the first received power and the second received power is determined to be greater than the predetermined value, controlling the terminal apparatus to end the communication, wherein in the obtaining, information indicating whether the terminal apparatus is to perform processing of the first carrier wave and the second carrier wave with one communication circuit or whether the terminal apparatus is to perform processing with separate communication circuits is obtained from the terminal apparatus.

18. A control method executed by a terminal apparatus that is connected to a base station apparatus, which uses first information, obtained from the terminal apparatus, for specifying a communication circuit of the terminal apparatus to perform control regarding dual connectivity or carrier aggregation, the control method comprising:

reporting, to the base station apparatus, the first information and second information relating to a first received power of a first carrier wave and a second received power of a second carrier wave, wherein the first carrier wave and the second carrier wave are used for the dual connectivity or the carrier aggregation, wherein the first information is information used for determining whether processing for a plurality of carrier waves is performed by using a single communication circuit or a plurality of separate communication circuits.

19. A non-transitory computer-readable storage medium that stores a program for causing, when the program is executed by a computer provided in a network node, the computer to:

obtain, from a terminal apparatus, information relating to a first received power of a first carrier wave and a second received power of a second carrier wave for the terminal apparatus;

set a first value as a predetermined value in a case where the terminal apparatus performs processing of the first carrier wave and the second carrier wave with one communication circuit and set a second value as the predetermined value in a case where the terminal apparatus performs processing of the first carrier wave and the second carrier wave with separate communication circuits;

determine whether or not a difference value between the first received power and the second received power is greater than the predetermined value on a basis of the information; and control the terminal apparatus to start communication using dual connectivity or carrier aggregation using the first carrier wave and the second carrier wave on a basis of the difference value between the first received power and the second received power being determined to be less than the predetermined value, wherein information indicating whether the terminal apparatus is to perform processing of the first carrier wave and the second carrier wave with one communication circuit or whether the terminal apparatus is to perform processing with separate communication circuits is obtained from the terminal apparatus.

20. A non-transitory computer-readable storage medium that stores a program for causing, when the program is executed by a computer provided in a network node, the computer to:

obtain, from a terminal apparatus, information relating to a first received power of a first carrier wave and a second received power of a second carrier wave for the terminal apparatus;

setting a first value as a predetermined value in a case where the terminal apparatus performs processing of the first carrier wave and the second carrier wave with one communication circuit and setting a second value as the predetermined value in a case where the terminal apparatus performs processing of the first carrier wave and the second carrier wave with separate communication circuits;

determine whether or not a difference value between the first received power and the second received power is greater than the predetermined value on a basis of the information; and in a case where the terminal apparatus is performing communication using dual connectivity or carrier aggregation using the first carrier wave and the second carrier wave and a difference value between the first received power and the second received power is determined to be greater than the predetermined value, control the terminal apparatus to end the communication, wherein information indicating whether the terminal apparatus is to perform processing of the first carrier wave and the second carrier wave with one communication circuit or whether the terminal apparatus is to perform processing with separate communication circuits is obtained from the terminal apparatus.

21. A non-transitory computer-readable storage medium that stores a program for causing, when the program is executed by a computer provided in a terminal apparatus, which is connected to a base station apparatus, which uses first information, obtained from the terminal apparatus, for specifying a communication circuit of the terminal apparatus to perform control regarding dual connectivity or carrier aggregation, the computer to:

report, to the base station apparatus, the first information and second information relating to a first received power of a first carrier wave and a second received power of a second carrier wave, wherein the first carrier wave and the second carrier wave are used for the dual connectivity or the carrier aggregation, wherein the first information is information used for determining whether processing for a plurality of carrier waves is performed by using a single communication circuit or a plurality of separate communication circuits.

* * * * *